(12) United States Patent
Loghmani et al.

(10) Patent No.: US 6,377,927 B1
(45) Date of Patent: Apr. 23, 2002

(54) VOICE-OPTIMIZED DATABASE SYSTEM AND METHOD OF USING SAME

(76) Inventors: Masoud Loghmani, 10607 Muirfield Dr., Potomac, MD (US) 20854; Fred F. Korangy, 2074 Maid Stone Farm Rd., Annapolis, MD (US) 21401

( * ) Notice: Subject to any disclaimer, the term of this patent is extended or adjusted under 35 U.S.C. 154(b) by 0 days.

(21) Appl. No.: 09/167,486

(22) Filed: Oct. 7, 1998

(51) Int. Cl.$^7$ .............................................. G10L 21/06
(52) U.S. Cl. ..................................... 704/275; 704/270
(58) Field of Search ................................ 704/275, 270, 704/256, 231, 246, 257

(56) References Cited

U.S. PATENT DOCUMENTS

| | | | |
|---|---|---|---|
| 5,291,583 A | 3/1994 | Bapat | 395/500 |
| 5,715,314 A | 2/1998 | Payne et al. | 380/24 |
| 5,745,681 A | 4/1998 | Levine et al. | 395/200.3 |
| 5,745,754 A | 4/1998 | Lagarde et al. | 395/615 |
| 5,761,280 A | 6/1998 | Noonen et al. | 379/93.27 |
| 5,799,278 A * | 8/1998 | Cobbett et al. | 704/256 |
| 5,802,526 A | 9/1998 | Fawcett et al. | 707/104 |
| 5,806,030 A | 9/1998 | Junqua | 704/245 |
| 5,806,033 A | 9/1998 | Lyberg | 704/255 |
| 5,809,462 A | 9/1998 | Nussbaum | 704/232 |
| 5,991,712 A * | 11/1999 | Martin | 704/9 |

* cited by examiner

*Primary Examiner*—William Korzuch
*Assistant Examiner*—Susan McFadden
(74) *Attorney, Agent, or Firm*—Roylance, Abrams, Berdo & Goodman, L.L.P.

(57) ABSTRACT

A voice-optimized database system and method of audio vector valuation (AVV) provides means to search a database in response to a spoken query. Audio vectors (AVs) are assigned to phonemes in the names or phrases constituting searchable items in a voice-optimized database and in spoken queries. Multiple AVs can be stored which correspond to different pronunciations of the same searchable items to allow for less precision on the part telephone callers when stating their queries. A distance calculation is performed between the audio vectors of database items and spoken queries to produce search results. Existing databases can be enhanced with AVV. Several alternate samples of a spoken query are generated by analyzing the phonemic string of the spoken query to create similar, alternate phonemic strings. The phonemic string of the spoken query and the alternate phonemic strings are converted to text and used to search the database.

13 Claims, 8 Drawing Sheets

VOICE-OPTIMIZED DATABASE SYSTEM AND METHOD OF USING SAME

CROSS REFERENCE TO RELATED APPLICATION

Related subject matter is disclosed and claimed in co-pending U.S. Patent Application of Masoud Loghmani et al., filed Oct. 6, 1998 and entitled "Telephony-Enabled Electronic Shopping System" (attorney's file 34999).

FIELD OF THE INVENTION

The invention relates to a voice-optimized database and a method of using audio vector valuation to search a voice-optimized database and to enhance existing, non-voice-enabled databases to perform searches from spoken queries.

BACKGROUND OF THE INVENTION

Existing electronic shopping cart technology is limited to serving customers who access online shopping sites using HyperText Markup Language (HTML) or other markup language browsers. Currently, no audio-capable electronic shopping cart exists for use with any kind of audio interface such as a telephone, or a computer with a microphone and voice output capability (e.g., voice over the Internet). Furthermore, no telephony interface exists which allows telephone customers to purchase goods offered via online shops.

To illustrate the above-described limitations, a conventional system 10 is depicted in FIG. 1 for shopping via the Internet 18. A user computer 12 (e.g., a personal computer or PC) having browser software 14 can connect via the public switched telephone network (PSTN) or other network 16 to an online shop 20 using different methods such as typing the Uniform Resource Locator (URL) of the online shop, if known, or selecting an online shop or the type of item desired from a home page generated at the PC. While browsing the online shop 20, the user PC 12 receives a number of HTML or Web-type pages for guiding the user when searching for one or more items to purchase and for completing the transaction by a payment method such as a credit card transaction. The transaction can be monitored using a shopping cart 22. An exemplary Web page 24 for allowing a user to conduct a search of items available via an online shop is depicted in FIG. 2. The description of the existing electronic shopping system 10 in FIG. 1 and of the illustrated embodiments of the present invention provided herein will be with reference to an online shop for purchasing books. It is to be understood that various aspects of the present invention can be used with any online shop or catalogue, as well as with any database for applications other than online shopping.

FIG. 3 depicts a conventional database 30 which comprises a number of records 32 such as a record 34 for each book in an online bookshop catalogue. Each record 34 has a number of fields 36, 38, 40, 42 and 44 for entering such information as the book title, author, subject matter, price, ISBN, respectively, among other information. As indicated by the onscreen buttons 40, 48, 50 and 52 in FIG. 2, the Web page 24 provides a user with the option of searching for a book on the basis of book title, author or subject, as well as searching the entire record for each book. The online shop can provide the online user with more specific search pages when one of the three buttons is selected. A processor 31 at the online shop generally searches one or more database fields using the text of the electronic query (e.g., "Gone With the Wind") 54 entered by a user via a Web page. The results of the search following the electronic query are then presented to the user PC via another Web page. If the search results locate an item desired by the user, the user can select that item for placement in an electronic shopping cart. Conventional electronic shopping carts 22 maintain a record of items selected by a user during a browsing session and can assist the user in completing a payment transaction to purchase some or all of the items in the electronic shopping cart during the browsing section or at the conclusion of the browsing session.

Since the online shop 20 receives text queries and reports search results via HTML pages, a user must have a computing device with a browser in order to search for an item available via the online shop, as well as to complete an electronic payment transaction as is the case with many online services. In addition, conventional electronic shopping carts are characterized by a number of drawbacks. Many existing electronic shopping carts maintain user identification and selection data for only a predetermined period. The shopping cart information for a user is generally removed from the server of the online shop shortly after a transaction is completed. The shopping cart information for a browsing session can also be removed during a browsing session after a prolonged period of inactivity. Thus, a user may have to repeat the browsing and shopping cart functions if the transaction data is removed from the server prior to the user making a final selection and purchase of database items.

Also, no database access system exists which allows data input based on spoken words, or has built-in search mechanisms for spoken queries. A built-in mechanism for spoken queries is different from providing a speech recognition system as an input mechanism to a database. In such a system, the speech recognition system receives audio samples, and converts the audio samples to text as though they were typed (e.g., entered in an onscreen query window such as in FIG. 2). The speech recognition system then sends the text output to the database for searching record field(s) based on text. The database has no means of searching based on a audio sample itself. Thus, a voice-optimized database is needed which permits an intelligent search of database records in response to spoken words.

SUMMARY OF THE INVENTION

The present invention overcomes the deficiencies of existing databases and realizes a number of advantages over these existing electronic systems for shopping via the internet by permitting use of spoken queries.

In accordance with an aspect of the present invention, a voice-optimized database system uses an Audio Vector Valuation (AVV) method to assign a value to every spoken query which was obtained from a speech recognition system, and then compares that to a limited set of possible outcomes, thereby making it possible to perform an intelligent search based on spoken words.

In accordance with another aspect of the present invention, each searchable item in the voice-optimized database has an associated audio vector. The audio vector comprises vector components having values for respective phonemes in the spoken name or phrase constituting the searchable item.

In accordance with still another aspect of the present invention, audio vectors determined for spoken queries are compared with audio vectors for database items to produce search results in response to spoken queries.

In accordance with still yet another aspect of the present invention, phonemes having similar pronunciation are assigned vector values which are close numerically. A distance calculation is performed between audio vectors corresponding to a spoken query and database items to produce search results.

The AVV method is used with a voice-optimized database configured in accordance with another aspect of the present invention. The AVV method can also be used as a separate mechanism to enhance existing databases which have no spoken query search capability. An AVV module is provided between a traditional speech recognition module and an existing, non-voice-enabled database. The existing database is provided with a library of phonemes and their respective values. The AVV module performs multiple queries for each spoken query. In each spoken query, the AVV module retrieves words from the database which have a similar pronunciation with the phrases received at the speech recognition module from a user.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 4:
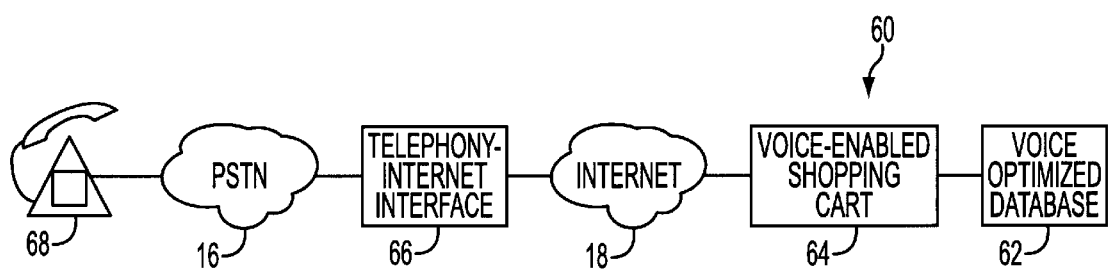
FIG. 4 is a diagrammatic illustration of a voice-enabled online shopping system constructed in accordance with an embodiment of the present invention.

With reference to FIG. 4, a voice-enabled system 60 for online shopping is provided in accordance with the present invention to allow customers to access an online shop, among other databases. The voice-enabled system 60 comprises three main subsystems, that is, a voice-optimized database or catalogue 62, a voice-enabled shopping cart 64 capable of generating output for both online shoppers using a browser and telephony users connecting through a telephony interface, and a telephony-Internet interface (TII) 66 which connects a user via a telephone 68 or other telecommunications device to an electronic shopping cart for online shopping. It is to be understood that the telephone 68 or other telecommunications device can connect to the TII 66 via wireline and wireless modes of communication.

Figure 5:
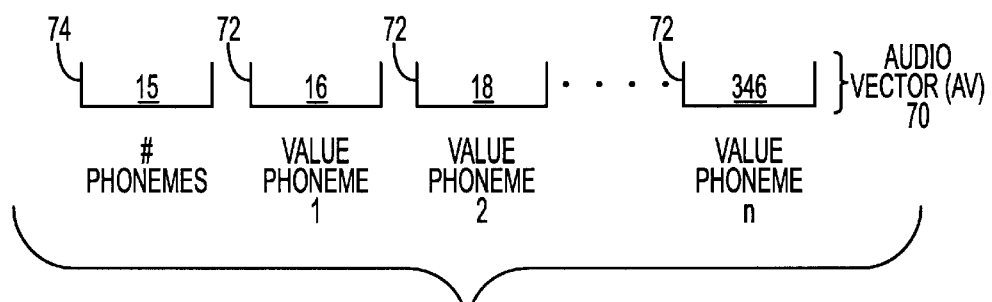
FIG. 5 illustrates an audio vector in accordance with an embodiment of the present invention.

The voice-optimized database is a database 62 of items which can be searched either using electronic queries (i.e., queries of the type normally available on Internet search engines), or spoken words over the telephone 68 or other audio mediums such as voice over the Internet. An important aspect of the voice-optimized database 62 of the present invention is that each searchable item stored therein is assigned an Audio Vector (AV) 70 which characterizes the item in terms of how the item sounds when spoken. For example, an AV 70 can comprise a string of values (e.g., 15, 16, 18 . . . 346), each of which corresponds to a vector component 72, as shown in FIG. 5. In accordance with an embodiment of the present invention, the values of vector components 72 are determined by the phonemes in the searchable item's name or phrase, that is, each vector component 72 can correspond to a numerical value assigned to a phoneme. Assignment of values to phonemes is based on how closely two phonemes sound. For example, the two allophones [p] and $[p^h]$ in "spit" and "pit", respectively, are preferably assigned very close values such as values that are numerically close in a range of values. An AV 70 can also comprise a vector component 74 indicating the number of phonemes which constitute the spoken phrase or the item name or phrase stored in a database to which the AV corresponds.

Figure 6:
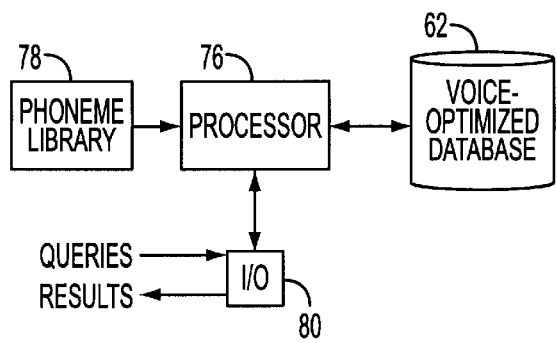
FIG. 6 is a block diagram of a voice-optimized database constructed in accordance with an embodiment of the present invention.

When a spoken query is received for the voice-optimized database 62, a processor 76 operating in conjunction with the database 62, as depicted in FIG. 6, is programmed to parse the query based on the phonemes therein, and to assign an AV 70 value to the query. Values for respective phonemes in the query can be obtained from a library 78, for example. A library 78 for a given language or dialect can store records of each phoneme used in that language and dialect. Each library record stores a predetermined value for that phoneme. Phoneme values can be individual numbers, or vectors if minute degrees of distinction are desired between similar-sounding phonemes. The voice-optimized database 62 is then searched for all searchable items having AV values close to the AV value of the spoken query. The processor 76 then reports the matching results via an input/output (I/0) module 80. Searching will be described with reference to FIG. 7. Reporting search results will then be described with reference to FIG. 8.

Figure 7:
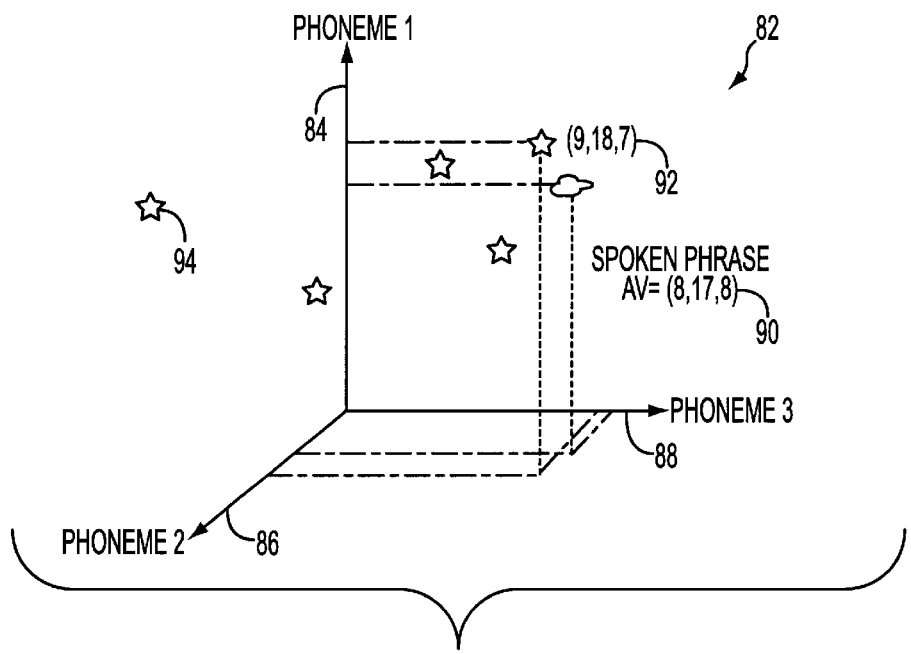
FIG. 7 illustrates audio vectors in a phoneme space in accordance with an embodiment of the present invention.

For illustrative purposes, FIG. 7 provides a simplified view of the phoneme space 82 associated with utterances having only three phonemes. As stated previously, an AV 70 is made of a number of vector components (e.g., components 72). Each vector component 72 represents a phoneme in a spoken phrase. Thus, a matrix having three axes 84, 86 and 88 (i.e., an x-axis, a y-axis and a z-axis) is used to represent the simplified phoneme space. The AV 90 for a spoken phrase is determined to be (8, 17, 8), while the AV 92 of a database item having similar pronunciation is (9, 18, 7). The AV 94 for a database item having a distinct pronunciation is (7, 30, -1).

By way of another example, the voice-optimized database processor 76 assigns a spoken phrase a Spoken Phrase Audio Vector $AV1=(x_0, y_0, z_0, k_0, l_0)$. As described in further detail below, AVs can be assigned to different pronunciations of each database item. The AVs assigned to each searchable database item is then used to determine if the same or similar phrase is in the database. A Database Item Audio Vector AV2 can be $(x_1, y_1, z_1, k_1, l_1)$, for example. A method of comparing the distance between the AV of a spoken phrase with the AVs of a database item having different lengths is described below. To search a database for a phrase using Audio Vectors, the following vector distance formula is used:

$$\text{Distance} = \text{Second Root of } [(x_0-x_1)^2 + (y_0-y_1)^2 + (z_0-z_1)^2 + (k_0-k_1)^2 + (l_0-l_1)^2]$$

The closest points are reported as matches to the user. A no-space distance calculation formula is preferably used. In accordance with the present invention, the vector distance formula is adapted to the situation wherein the number of detected phonemes is not equal to the number of phonemes in a given database item keyword or phrase. In such cases, the following algorithm is used:

For all keywords in a given field in the database (e.g., author name):

If number of components of the spoken query equals the number of components in the keyword, then calculate distance according to the above vector distance formula;

Otherwise, if the number of components of the spoken query is more than the number of components in the keyword by n% (e.g., n=5–20%), then:

(1) Remove the most distant, excess components from the spoken query AV, and (2) calculate distance according to the above vector distance formula;

Otherwise, if the number of components of the spoken query is less than the number of components in the keyword by n%, then:

(1) Remove the most distant, excess components from the keyword AV, and (2) calculate distance according to the above vector distance formula;

Otherwise, ignore this keyword and continue to process the next keyword.

Exact matches between the audio vectors of a spoken query and database items are not required, allowing users to be less precise when stating a query. A voice-enabled database 62 stores a plurality of AVs for each searchable item in a database. AVs corresponding to different pronunciations of each searchable item are stored in the voice-enabled database. Different pronunciations can include anticipated differences is callers' speech patterns (e.g., "I bet you" and "I be chu"), as well as different expressions for the same item (e.g., different expressions for numbers). For example, a user can speak the ISBN number of a desired book that the user wishes to order from an online book shop. Audio vectors are provided for spoken words such as "one, three, two, zero, "one, three, two, '0'", and "one thousand, three hundred and twenty". The database stores several of these AVs for the searchable item "1320". The above-referenced formula is used to relate audio vectors for these different spoken queries to one of the stored AVs during a search. In addition to taking into account different data formats or types (e.g., numeric, decimal, alphanumeric, binary, hexadecimal), the processor 76 can take into account different conjunctions of phonemes. In accordance with the present invention, the processor 76 can compare AVs for spoken words such as "I bet you" and "I be chu" to different AVs stored for "I bet you" as a searchable item in the database. As will be described below, the AVV method can be provided as an AVV module to a system which does not have a voice-enabled shopping cart 64 or a voice-optimized database 62. Accordingly, AVV can be performed by processors other than the processor 76.

In accordance with the present invention, Audio Vector Valuation (AVV) is used to provide an audio interface to other electronic systems wherein knowledge of potential requests (i.e., knowledge of the context in which requests will be made) can facilitate the identification of a user's spoken words. For example, when a caller is giving an online shop his or her address via a telephone, the voice-enabled system 60 of the present invention can instruct the user to first provide a zip code. The user can enter the zip code by dialing the corresponding digits on the telephone keypad to generate appropriate dual-tone multi-frequency signals which can be translated to the zip code by the TII 66, for example. The voice-enabled shopping cart 64 can then instruct the user to say his or her street name. When the street name is spoken, the voice-optimized database 62 matches the audio pattern to the closest match in a database of street names within the given zip code, thereby alleviating the need for spelling of the name via the telephone keypad. As the above example demonstrates, Audio Vector Valuation can be used in many different applications, to match a spoken pattern with the knowledge of the context in which it is said.

Throughout the description of the present invention, an HTML-type page is understood to mean any type of hyper-text or mark-up language (e.g., HTML, DHTML and XML) or language using hidden tags in text for creating, for example, Web-type pages for browsing content. As stated previously, telephone users do not have a computer with which to receive HTML-type pages to query and view search results from an online database. The TII 66 described below provides a mechanism to facilitate audio messaging to report search results, among other events and information, to a telephony customer. In accordance with an aspect of the present invention, the voice-enabled shopping cart 64 is operable to generate hidden tags to convert search results and other information provided by the online shop 20, which can be in a text or HTML format, for example, to an audio message that can be provided to a telephony customer.

Figure 8:
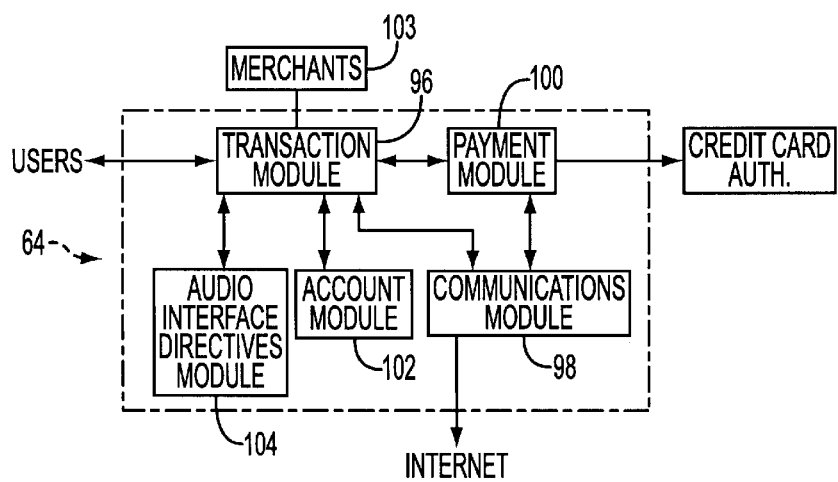
FIG. 8 is a block diagram of a voice-enabled shopping cart constructed embodiment of the present invention.

The voice-enabled shopping cart 64 of the present invention is a software module to provide a layer of control above the voice-optimized database 62 of the present invention or an existing database (e.g., database 30) to facilitate online shopping. As shown in FIG. 8, the voice-enabled shopping cart 64 comprises transaction module 96 for communicating with a user computer or the TII 66, for example, a communications module 98 for communicating with an online shop or other database, a payment module 100 for completing electronic credit card transactions, and an account module 102 for monitoring each user transaction and the user's selections during a browsing session and, optionally, account information for users who are account holders. Thus, an account holder can browse an online shop, select items for the voice-enabled shopping cart, hang-up before purchasing the items, and then call the online shops at a later time to complete the transaction. The account module 102 is useful for maintaining company accounts. Employees can browse company-approved suppliers online to make selections and log-off prior to purchasing their selections. A company purchasing manager can then access the shopping carts created using a company account at the end of a business day, for example, and approve or disapprove of selections in each cart and complete a purchase transaction for approved items. The account module 102 can provide different levels of access. For example, one level of access can be restricted to cart selections only with no purchase capability. Another access level can permit order approvals and purchasing. The shopping cart 64 is configured to provide a merchant 103 with shopping cart contents or lists for fulfillment. Merchants can obtain lists via facsimile, e-mail or other communications means. Merchants can also access the shopping cart to download lists which have been approved for ordering.

In accordance with the present invention, the voice-enabled shopping cart also comprises an audio interface directives module 104 for providing hidden tags in the HTML-type pages provided by the online shop during a browsing session. The hidden tags are used by the TII 66 and other audio interfaces (e.g., Netscape browser with audio plug-in) to locate relevant information in an HTML-type page (e.g., a search result page indicating that the online shop has two book titles relating to a particular subject specified in a spoken query). For example, the hidden tags indicate where the book title information, price information or out-of-stock message is located in a search results HTML page returned by an online bookstore in response to a spoken query. The TII 66 can then generate an appropriate audio message to provide the search result data to the user. Since the search result pages for different online shops comprise different information in different locations within an HTML page, the voice-enabled shopping cart 64 can be provided to different online shops with scripts to assist online shop providers in modifying their respective search results pages and any other pages to include hidden tags or other data in the HTML-type page(s) as necessary to communicate with the TII 66.

Figure 9:
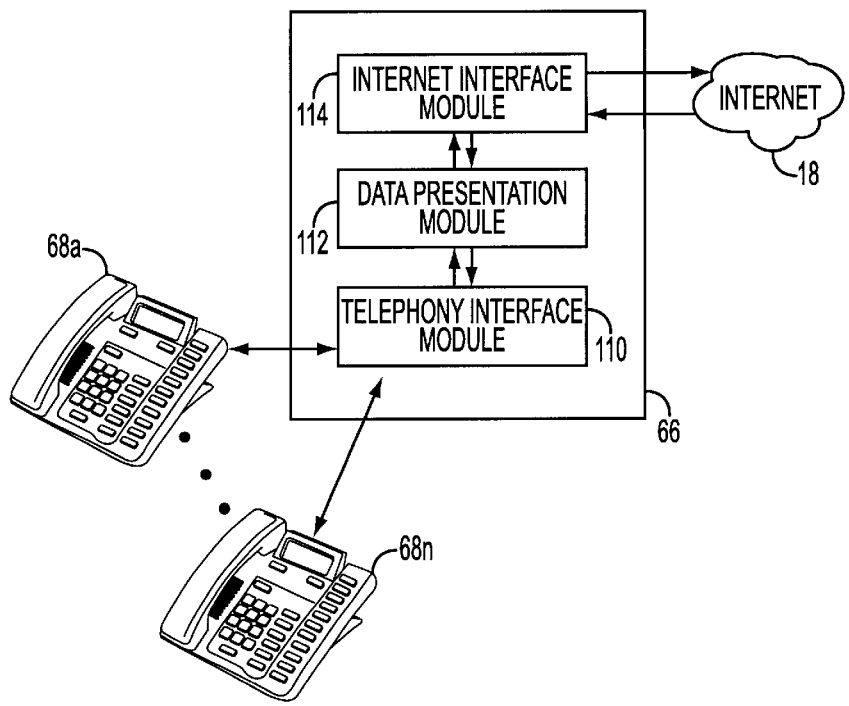
FIG. 9 is a block diagram of a telephone-internet interface for online shopping constructed in accordance with an embodiment of the present invention.
Figure 10:
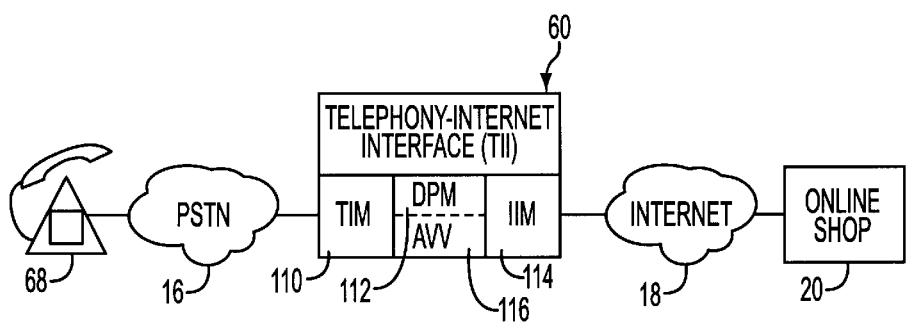
FIGS. 10, 11, 12, 13 and 14 are block diagrams of different configurations of a voice-enabled online shopping system constructed in accordance with an embodiment of the present invention.

The TII 66 allows customers to access an Internet or online shop using plain old telephone service (POTS) telephones, computers or other telecommunications devices. The TII 66 comprises hardware and software components to connect to the Public Switching Telephone Network (PSTN), as well as the Internet. The subsections of the TII 66 are shown in FIG. 9.

A Telephone Interface Module 110 is provided which has hardware and software components for handling incoming calls from the PSTN, and provide audio communications to customers. For example, the TII 66 can instruct a telephone user to select one of a preselected number of Internet sites to which access is desired by selecting from pre-recorded menu options. The user responds by stating or dialing a digit corresponding to the selected menu option. TIM 110 also performs speech recognition, speech-to-text and text-to-speech conversion operations, if necessary. The text/speech conversion can be implemented via commercially available software. TIM can handle multiple connections at any given time.

A Data Presentations Module (DPM) 112 converts commands received from the TIM 110 into electronic commands such as HTTP requests (e.g. HTTP get and HTTP post) and other electronic communication protocols, and changes replies received from an Internet Interface Module (IIM) 114 to information that can be presented to a customer in an audio format by the TIM. To communicate with the above-mentioned pre-selected sites, the DPM 112 uses scripts to translate user inputs (e.g., DTMF tones or speech that has been converted to text by the TIM 110) into input information (e.g., electronic commands such as HTTP requests and site-specific queries) for these sites. The DPM 112 parses the HTML-type information returned by a site (e.g., an online shop or database) via the IIM and posts queries to the site query pages provided to the IIM 114. By parsing the information in the HTTP replies, important data items are extracted and can be reported to the customers. If the electronic shopping cart used is a voice-enabled shopping cart 64 (FIG. 8), the DPM looks for hidden tags generated by the voice-enabled shopping cart to identify the important data items. To parse the output of other shopping carts, DPM uses site specific scripts which help to identify what each site's output means, and where important data elements reside. For example, when looking at an online bookstore's search output, the DPM preferably extracts only names of any books found to match or are similar to a user's query. The DPM can handle multiple customers at any given time.

The Internet Interface Module (IIM) 114 consists of the hardware and software for connecting to the Internet. The IIM handles multiple connections to different sites (e.g., online shops). IIM 114 receives connection commands and addresses from the DPM 112, and returns results in form of HTML-type pages or pages created using other mark-up languages.

The voice-enabled system of the present invention can be implemented in a number of different ways. The voice-enabled system can provide a fully integrated solution for online shopping, as well as telephone shopping, or only a portion of the solution. The voice-enabled system of the present invention can be integrated into an existing shopping cart, an existing database, or an existing telephone shopping system which currently has no online capability (e.g., a catalog order system using telephone operators to process transactions). A few of these different configurations, in which one or more elements of the voice-enabled system 60 are used, are described below in connection with FIGS. 10–13 for illustrative purposes. It is to be understood that other configurations are possible.

In a full implementation of the voice-enabled system, the components described above in connection with FIG. 4 are used to provide Internet catalogue and database capabilities, a voice-enabled electronic shopping cart and telephone-Internet interface capabilities for users. In the configuration depicted in FIG. 10, only the TII 66 is used to provide connectivity to an existing online shop. Since the database in this configuration does not support Audio Vector Valuation for voice queries, the DPM 112 is enhanced with a Audio Vector Valuation Module 116 to send in multiple queries based on what a given query sounds like. For example, phonemes are determined for "Gone with the Wind", or "Gone wid da Wind", or "Gone vid da Vind", and so on. Linguistic rules are used to select different pronunications of a requested item. The phonemes are converted to text. Multiple types of related text is therefore determined for the spoken query text. Searches are then performed in the database using the spoken query text and the related text.

Figure 11:
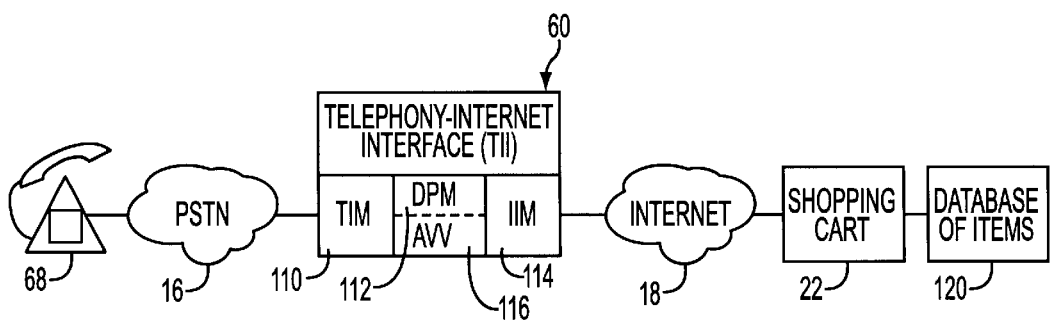

In FIG. 11, a TII 66 and a shopping cart 22 are connected to an existing database 120 of items to provide an online shop that is also accessible by telephone. As in FIG. 10, the TII 66 can be enhanced by an Audio Vector Valuation module 116 to compensate for lack of such functionality in the database 120. As stated previously, a voice-enabled database is configured to store AVs for multiple pronunciations of searchable items in the database. In a non-voice-enabled database, several samples of a spoken query are generated to conduct multiple searches of the data in the database. The phoneme string of the spoken query sample is selectively divided and regrouped to create, for example, five or six variations of the phoneme string. In accordance with the present invention, individual phonemes in the string are analyzed, as well as combinations of phonemes and individual phonemes which have been divided. These components of the string are analyzed in phonemic space to compare respective vector distances, for example. Phonemes and corresponding string components which are relatively close in value indicate possible desirability of these string components in alternate samples. The spoken query samples and the alternate samples are then converted to text for searching the database for corresponding items.

In accordance with the present invention, a voice-enabled database and a non-voice-enabled database are searched with regard to plural possibilities for a spoken query. In the voice-enabled database, AVs are stored for plural anticipated pronunciations of the same database item for comparison to the AV of a spoken query. The phonemic string of a spoken query is used to create plural samples for searching a non-voice-enabled database having no AVs stored therein. In either case, the use of phonemes is used to convert from spoken words to concepts in that plural pronunciations for the same database item are considered for searching database content. The audio processing of the present invention therefore realizes an advantage over existing phoneme recognition systems which merely analyze phonemes for word recognition.

Figure 12:
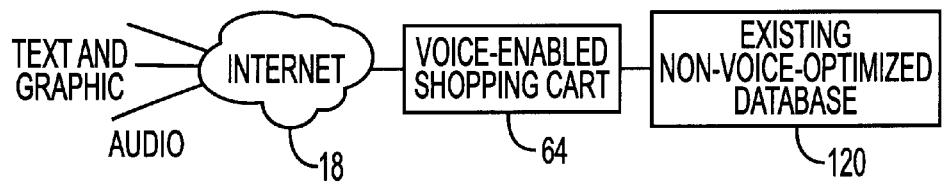
Figure 13:
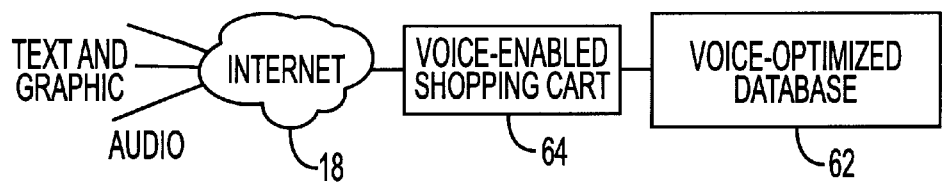
Figure 14:
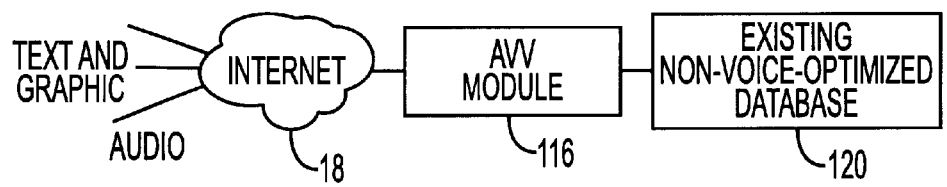

The audio interface can be accomplished using a technology similar to TII 66, or voice over IP, or other means. In FIG. 12, a voice-enabled shopping cart is used to access an existing database of items or catalogue and provide shoppers with a means for electronic shopping. In addition to traditional shopping cart functions (e.g., keeping track of a shopper's purchases, communicating with the catalogue, and sending information to a payment system), the voice-enabled shopping cart provides directives for audio interface systems to allow telephone callers to access the shop. Thus, an online shop is provided to support online customers using text, graphics, and audio interfaces. FIG. 13 is similar to FIG. 12, except a voice-optimized database is used. In FIG. 14, an AVV module 116 is provided to an existing database in lieu of a voice-enabled shopping cart to allow access to the database via spoken queries.

Figure 15A:
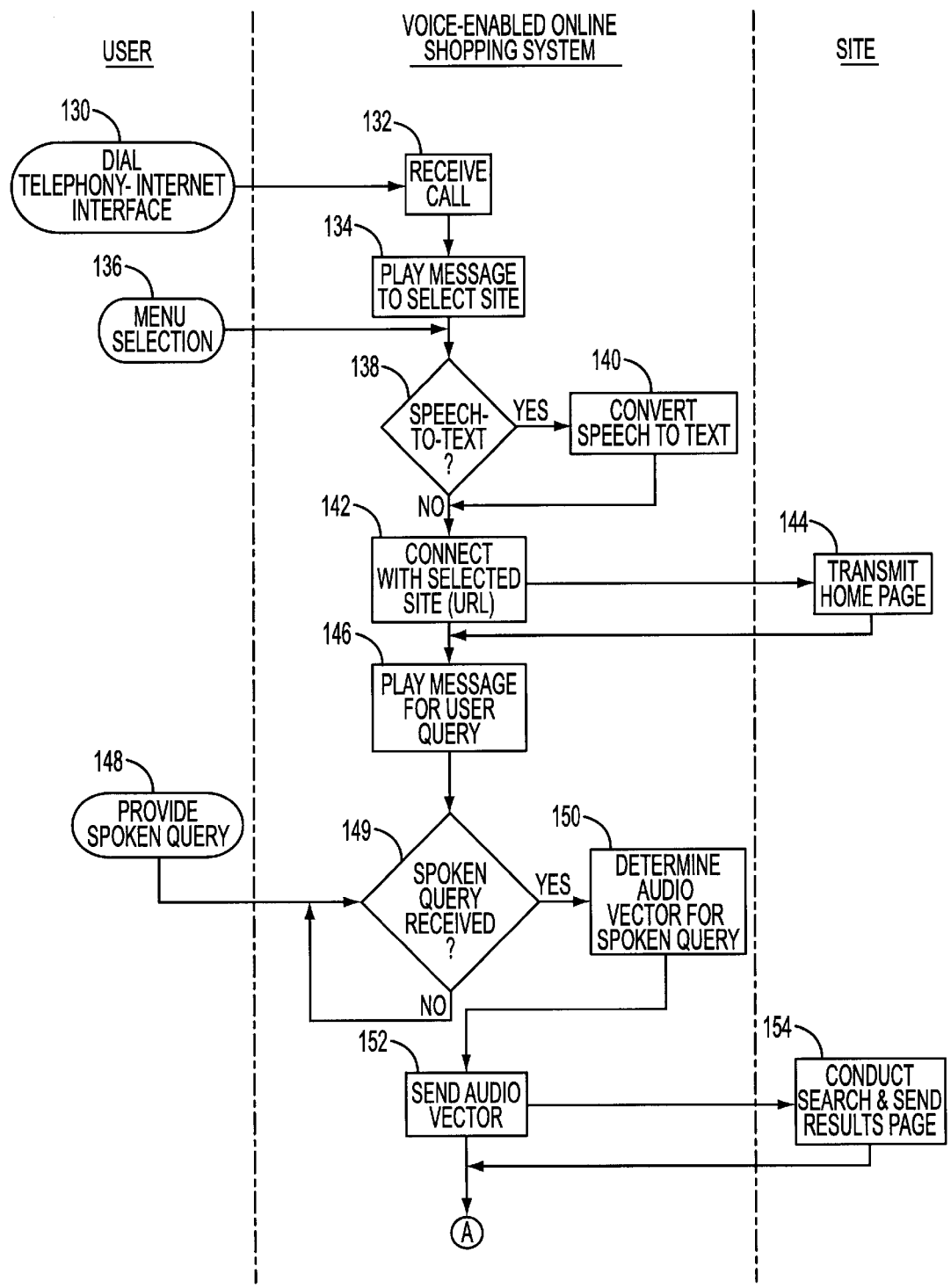
FIGS. 15A and 15B are flow charts depicting a sequence of operations for browsing an online shop using a telephone or other audio interface in accordance with an embodiment of the present invention.
Figure 15B:
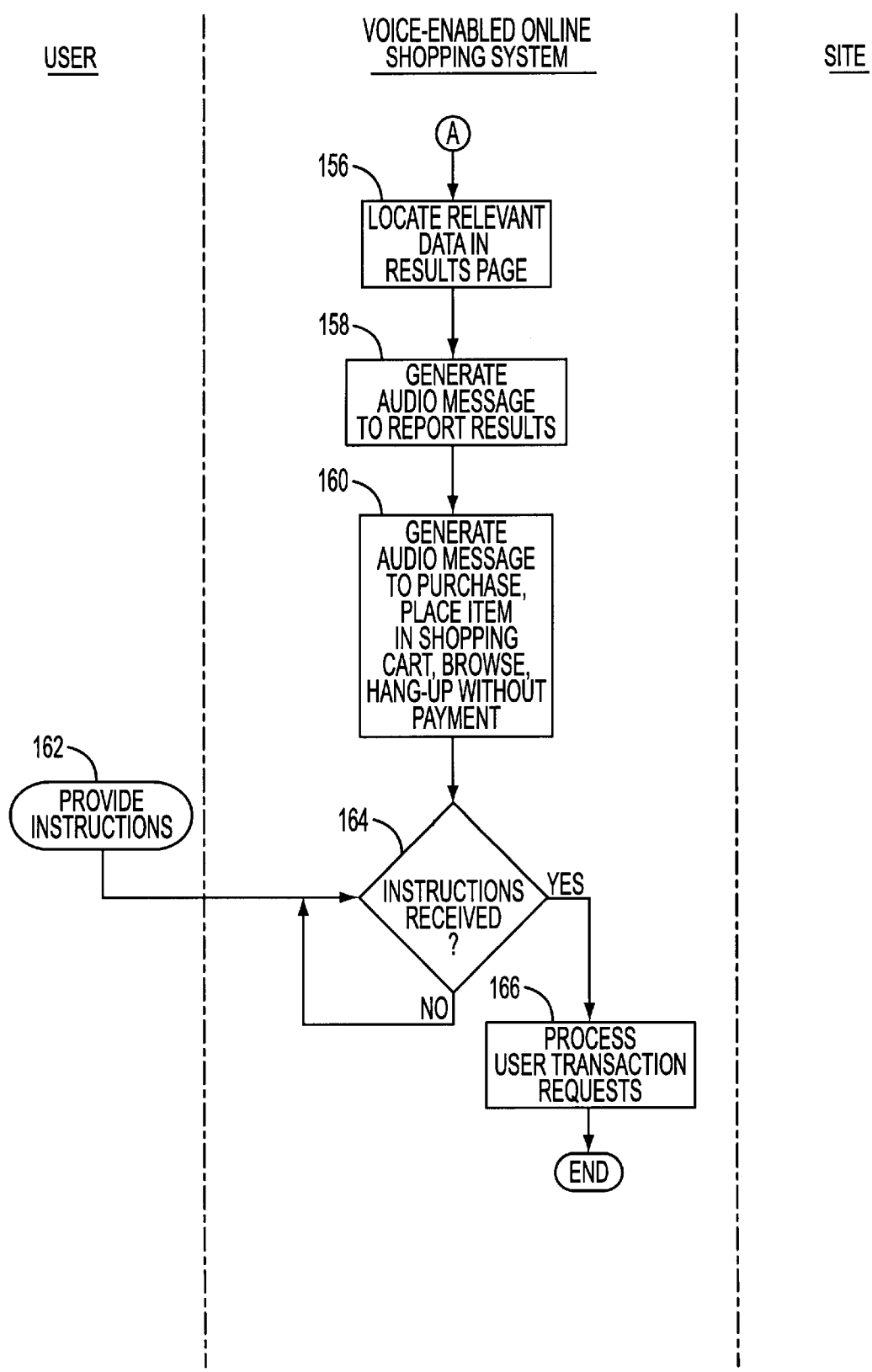

An exemplary voice transaction with an online shop is illustrated in FIGS. 15A and 15B. A user calls a TII 66 using an '800' number, for example (blocks 130 and 132). The TIM 110 plays a pre-recorded message to the user to provide a number of site options (e.g., "If you wish to browse for books, dial or say '1' . . . " If you wish to browse for computer equipment, dial or say '2' . . . " If you wish to browse for airline tickets, dial or say '3' . . . " If you wish to repeat this list, press the pound key or say 'repeat'"), as indicated in block 134. In the illustrated example, the caller selects to browse for books. The TIM 110 provides the user selection information to the DPM 112. If the caller stated "1" (block 136), as opposed to dialing the menu selection, the TIM 110 performs speech-to-text conversion (blocks 138 and 140).

Figure 1:
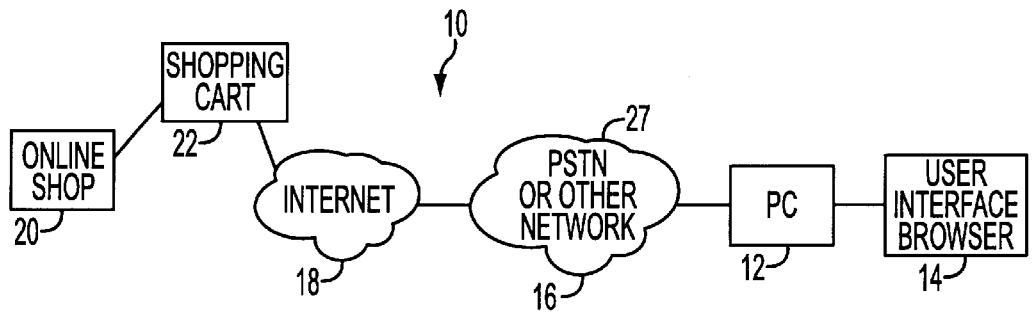
FIG. 1 is a diagrammatic illustration of a conventional electronic online shopping system.
Figure 2:
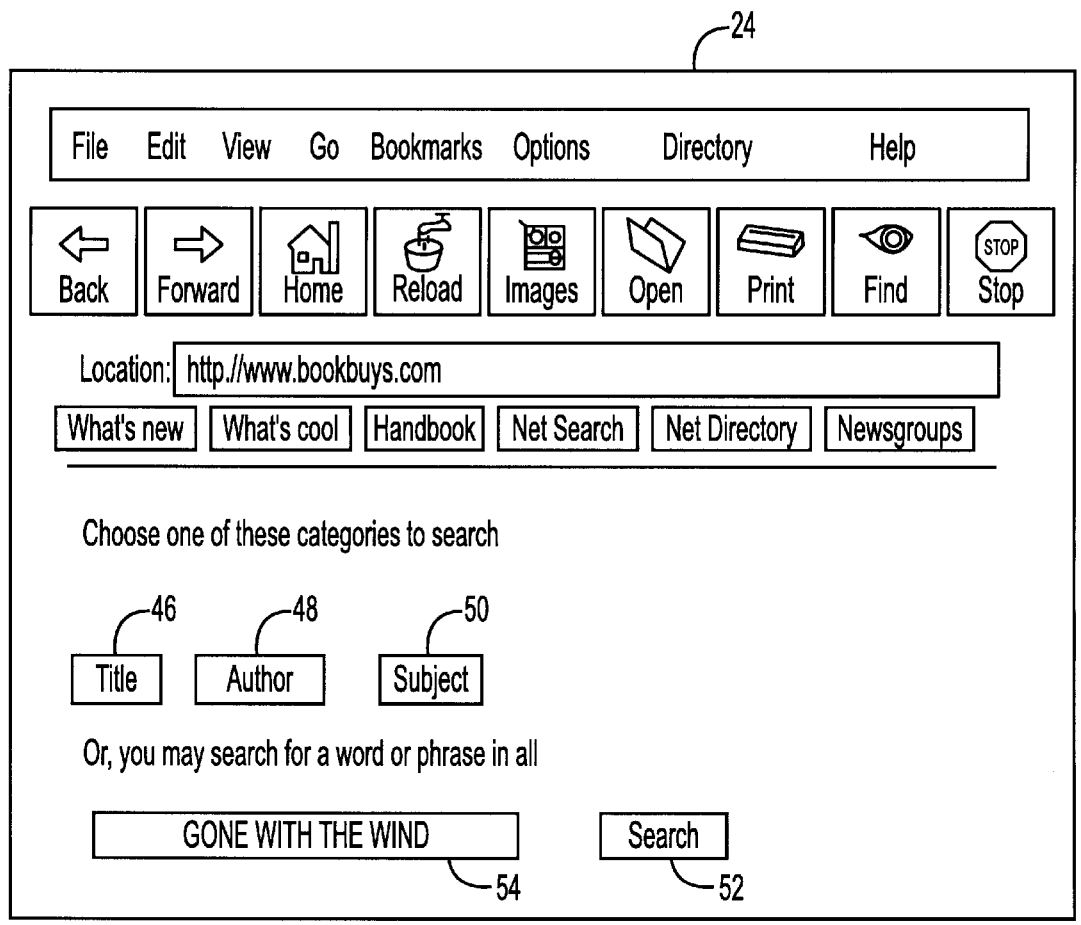
FIG. 2 is a diagrammatic illustration of an exemplary HTML page generated on a customer computer while browsing online.
Figure 3:
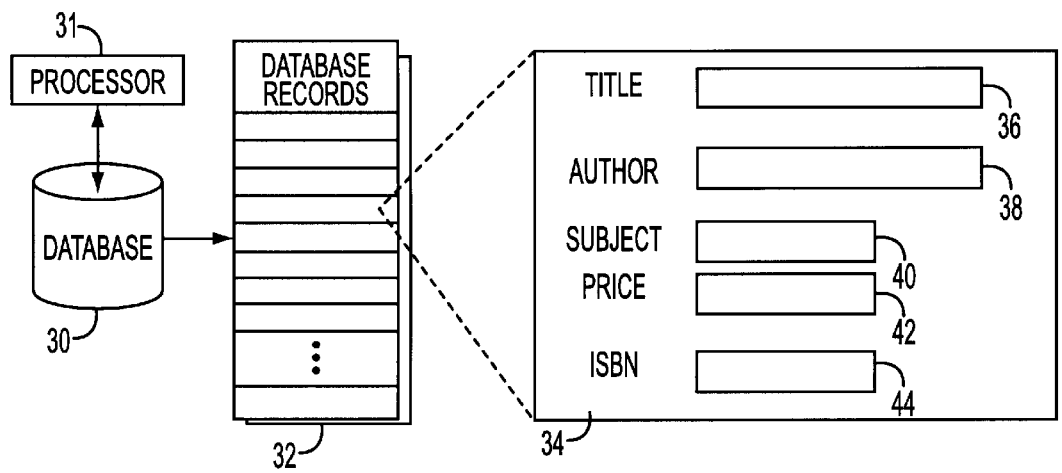
FIG. 3 is a diagrammatic illustration of a conventional database having records with record fields.

The DPM uses an input script to provide the URL for the online bookshop and contacts the online bookshop via the IIM 114 (block 142). As indicated in FIG. 144, the online bookshop returns a Web-style home page which provides browser users with onscreen prompts to enter query information, such as the page 24 in FIG. 2. The DPM 112 provides an audio message to the user via the TIM 110 which instructs the user to state the name or author of a book, for example (block 146). The message can also instruct the user to state a search category (e.g., "subject" or "title" or "author" or "ISBN"). Thus, if the user states "subject", the DPM 112 is programmed via an input script to select the button 50 in the query page 24 (FIG. 2) via an electronic command. The online bookshop can then perform a context-sensitive search of subject matter in its database, as well as search only the subject fields 40 of database records 34 instead of every searchable item in each record.

After the user provides a spoken query such as "civil war" (blocks 148 and 149), the query is processed by a speech recognition module in the TIM 110. An audio vector 70 is determined for the spoken query using, for example, an AVV module 116 at the TII 66 (FIG. 4) or at a shopping cart in front of a non-voice-enabled database (FIG. 12) or at a voice-optimized database 62, for example, depending on the configuration of the voice-enabled shopping system of the present invention (block 150). The online bookshop searches its records for database items that are close to the spoken query and transmits a Web-type results page to the TII 66 (blocks 152 and 154).

The DPM 112 parses the results page to locate hidden tags if a voice-optimized shopping cart 64 is used; otherwise, the DPM 112 uses site-specific scripts to locate relevant information (e.g., titles of books having AVs which are close to the spoken query AV) to report to the caller (block 156). The DPM 112 can play a pre-recorded message to the caller when no books are located which are similar to the spoken query. Text corresponding to the title in the results page can be converted to speech by the TIM 110 to provide at least a few of the book titles listed in the results page to the caller (block 158). Another message can be generated by the DPM 112 to instruct the user to select from a menu of options such as placing selected book titles from the results page in a shopping cart 64 or 22 and commencing a payment transaction ("block 160). The DPM 112 has a number of scripts and messages for handling shopping cart and payment transactions, as well as the above-referenced browsing operations (blocks 162, 164 and 166).

Figure 16:
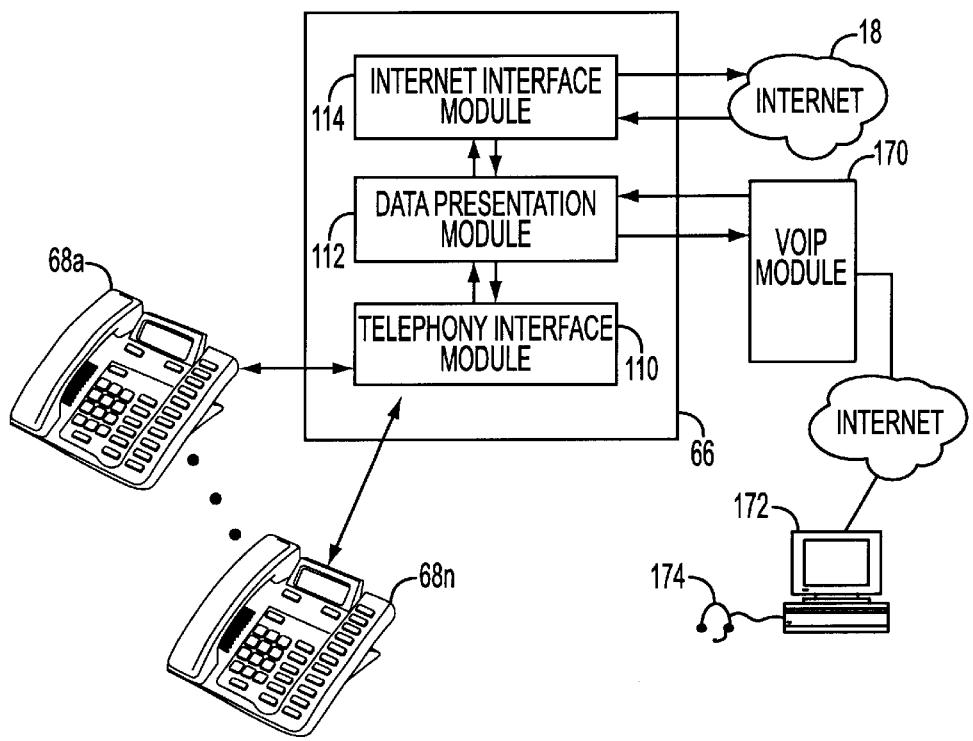
FIGS. 16 and 17 are block diagrams of a voice-enabled Internet interface for online shopping using voice over the Internet in accordance with an embodiment of the present invention.
Figure 17:
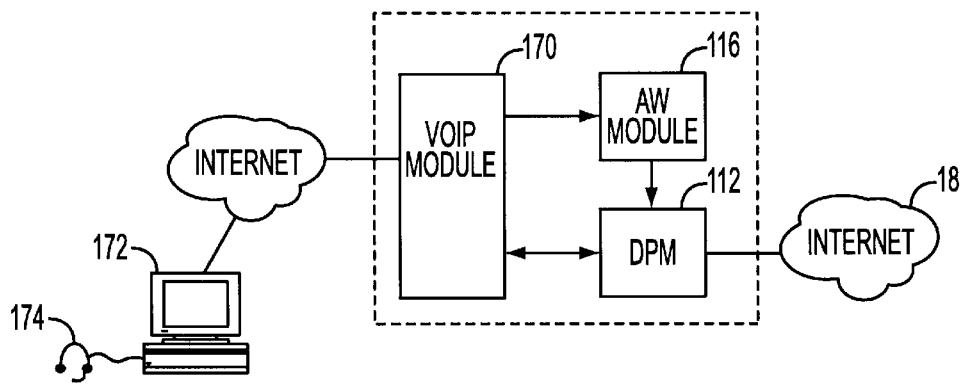

With reference to FIGS. 16 and 17, a voice-enabled Internet interface is provided to access an online catalogue or other database using voice over Internet Protocol (VOIP). As shown in FIG. 16, a VOIP module 170 is connected between a DPM 112 and a computer 172 with a microphone 174. The configuration depicted in FIG. 16 supports online shopping access by telephone 108 and user computers 172 employing VOIP. FIG. 17 depicts a voice-enabled Internet interface for computers 172 and no telephones.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A voice-optinized database system for allowing users to access an electronic shopping cart to purchase items offered through an online shop using spoken queries comprising:
   a memory device for storing records for said items; and
   a processing device connected to said memory device and operable to retrieve selected ones of said records from said database in response to said spoken queries, said memory device being configured to store for each of said records at least one phoneme vector for parsing of said memory device by said processing device in response to said spoken queries;
   wherein each of said records has at least one searchable field comprising item data that is characterized by phonemes, said phonemes being assigned respective values, said phonemes having similar pronunciation being assigned similar values, each said phoneme vector comprising said values corresponding to said phonemes in said at least one searchable field.

2. A database system as claimed in claim 1, wherein each said phoneme vector comprises vector components, one of said vector components indicating the number of phonemes associated with said item data in the corresponding said at least one searchable field, and other said vector components comprising respective said values of said phonemes in the corresponding said item data.

3. A method of retrieving items from a database in response to a spoken query comprising the steps of:

assigning a database item phoneme vector to each of a plurality of items in said database, each of said items comprising at least one phoneme, each said phoneme having a unique value assigned thereto and stored in a table, said database item phoneme vector comprising a vector component indicating the number of said phoneme of which the corresponding said item is composed, and phoneme vector components which each comprise said unique value corresponding to a respective said phoneme in one of said items;

determining a spoken phrase phoneme vector for said spoken query, said spoken query being analyzed to determine each said phoneme thereof, said spoken phrase phoneme vector of said spoken query comprising said phoneme vector components each having said unique value for a respective said phoneme in said spoken query and a value indicating the number of said phoneme in said spoken query; and comparing at least a portion of said spoken phrase phoneme vector with at least a portion of said database item phoneme vector corresponding to each of said items.

4. A voice-optimized database system for allowing users to access an electronic shopping cart to purchase items offered through an online shop using spoken queries comprising:

a memory device for storing records for said items; and a processing device connected to said memory device and operable to retrieve selected ones of said records from said database in response to said spoken queries, said memory device being configured to store for each of said records at least one audio vector for parsing of said memory device by said processing device in response to said spoken queries;

wherein each of said records has at least one searchable field comprising item data that is characterized by phonemes, said phonemes being assigned respective values, said phonemes having similar pronunciation being assigned similar values, each said audio vector comprising said values corresponding to said phonemes in said at least one searchable field;

wherein said comparing step comprises the steps of assigning query coordinates to respective said phoneme represented in at least a portion of said spoken phrase audio vector to define said portion of said spoken phrase audio vector in accordance with a matrix position in a matrix having as many axes as the number of said phoneme in said portion of said spoken phrase audio vector, each of said query coordinates having a value corresponding to said unique value of the related said phoneme;

assigning item coordinates to respective said phoneme in at least a portion of each said database item audio vector to define said portion of each said database item audio vector in accordance with a matrix position in said matrix, said portion of said database item audio vector as having the same number of said phoneme as said portion of said spoken phrase audio vector, each of said items coordinates having a value corresponding to said unique value of the related said phoneme; and calculating distance between respective ones of said query coordinates and said item coordinates to determine which of said items are similar to said spoken query.

5. A method as claimed in claim 14, wherein said calculating step comprises the steps of:

removing the most distal ones of said item coordinates from said database item audio vector when said spoken phrase audio vector has fewer said phoneme vector components than said database item audio vector; and removing the most distal ones of said query coordinates from said spoken phrase audio vector when said database item audio vector has fewer said phoneme vector components than said spoken phrase audio vector.

6. A method as claimed in claim 3, wherein a plurality of said phoneme having similar pronunciation are assigned unique values which are numerically close in value and a plurality of said phoneme having distinct pronunciation are assigned unique values having increasingly different numerical values depending on the degree of distinctness in pronunciation.

7. A method as claimed in claim 6, wherein said unique value is a vector in a matrix having a number of axes corresponding to a number of levels of contrast desired between said phoneme having similar pronunciation.

8. A method as claimed in claim 3, wherein said database comprises context data to relate groups of said item s to different subjects, said comparing step comprising the step of:

determining to which of said subjects said spoken query relates; and comparing at least a portion of said spoken phrase phoneme vector with at least a portion of said database item phoneme vector corresponding to each of said items relating to said subject.

9. A method as claimed in claim 3, where in said database comprises records having data fields and context data to relate at least one of said records and said data fields to different subjects, said comparing step comprising the step of:

determining to which of said subjects said spoken query relates; and comparing at least a portion of said spoken phrase phoneme vector with at least a portion of said database item phoneme vector corresponding to each of at least one of said records and said data fields relating to said subject.

10. A method as claimed in claim 3, further comprising the steps of:

selecting multiple pronunciations of each of said items;

assigning a corresponding said database item phoneme vector to each of said multiple pronunciations for storage in said database for the corresponding one of said items; and comparing at least a portion of said spoken phrase phoneme vector with at least a portion of each said database item phoneme vector corresponding to each of said items and said corresponding multiple pronunciations of said items.

11. A method of providing an existing database with a spoken query response capability comprising the steps of:

accessing a library of phonemes;

translating a spoken query into a group of said phonemes corresponding thereto and selected from said library;

converting said group of phonemes into query text;

generating alternate test by performing at least one of a plurality of operations comprising processing said group of phonemes to produce an alternate group of phonemes by selectively using at least one of individual said phonemes, divided said phonemes and regrouped said phonemes and converting said alternate group of phonemes to text, and selecting other text that is related said query text, said other text characterized by at least one of similar pronunciation to any of said group of phonemes, comprising allomorphs similar to allomorphs in any of said group of phonemes and having similar meaning to said query text but different format; and conducting searches of said database in response to said spoken query using said query text and said alternate text.

12. A method as claimed in claim 11, wherein said phonemes in said library are assigned respective values, said values of said phonemes having similar pronunciation being close numerically and said values of said phonemes having distinct pronunciation having greater numerical differences than said values of similar said phonemes, said selecting step comprising the step of selecting said other text having said phonemes with said values that are numerically close with respect to said values of any of said group of phonemes.

13. A method as claimed in claim 11, wherein said query text corresponds to a number and said selecting step comprises the step of selecting said other text corresponding to names of digits in said number, and names of decimal components of said number.

* * * * *